United States Patent
Stoychev et al.

(10) Patent No.: US 11,655,352 B2
(45) Date of Patent: May 23, 2023

(54) RECYCLED POLYOL

(71) Applicant: H & S Anlagentechnik GmbH, Sulingen (DE)

(72) Inventors: Valentin Stoychev, Wildau (DE); Marin Boyadzhiev, Teltow (DE)

(73) Assignee: H&S ANLAGENTECHNIK GMBH, Sulingen (DE)

( * ) Notice: Subject to any disclaimer, the term of this patent is extended or adjusted under 35 U.S.C. 154(b) by 842 days.

(21) Appl. No.: 16/461,707

(22) PCT Filed: Nov. 16, 2017

(86) PCT No.: PCT/EP2017/079418
§ 371 (c)(1),
(2) Date: Jun. 12, 2019

(87) PCT Pub. No.: WO2018/091575
PCT Pub. Date: May 24, 2018

(65) Prior Publication Data
US 2019/0359788 A1 Nov. 28, 2019

(30) Foreign Application Priority Data
Nov. 18, 2016 (DE) .......................... 102016122276.3

(51) Int. Cl.
| | |
|---|---|
| *C08J 11/26* | (2006.01) |
| *C08J 11/24* | (2006.01) |
| *C08G 18/24* | (2006.01) |
| *C08K 3/013* | (2018.01) |
| *C08G 18/40* | (2006.01) |
| *C08G 18/76* | (2006.01) |
| *C08K 3/22* | (2006.01) |
| *C08K 5/17* | (2006.01) |
| *C08K 3/26* | (2006.01) |

(52) U.S. Cl.
CPC ............. *C08J 11/26* (2013.01); *C08G 18/242* (2013.01); *C08G 18/409* (2013.01); *C08G 18/76* (2013.01); *C08J 11/24* (2013.01); *C08K 3/013* (2018.01); *C08K 3/22* (2013.01); *C08K 5/17* (2013.01); *C08F 2500/17* (2013.01); *C08G 2110/0025* (2021.01); *C08J 2375/04* (2013.01); *C08K 2003/262* (2013.01)

(58) Field of Classification Search
CPC ......... C08J 11/24; C08J 11/26; C08G 18/242; C08G 18/409
See application file for complete search history.

(56) References Cited

U.S. PATENT DOCUMENTS

| | | | | |
|---|---|---|---|---|
| 4,044,046 A | * | 8/1977 | Kondo | ...................... C08J 11/18 560/33 |
| 10,233,278 B1 | * | 3/2019 | Ionkin | .................. C08G 18/225 |
| 2014/0051779 A1 | * | 2/2014 | Casati | ................ C08G 18/0876 524/789 |

FOREIGN PATENT DOCUMENTS

| | | |
|---|---|---|
| DE | 2009/000604 A1 | 9/2009 |
| EP | 0682063 A1 | 11/1995 |
| EP | 0718349 B1 | 6/1996 |
| JP | 7-304947 A | 11/1995 |
| JP | 8-245825 A | 9/1996 |
| RU | 2252234 C2 | 5/2005 |
| RU | 2380388 C2 | 1/2010 |
| RU | 2626960 C2 | 8/2017 |
| SU | 1650661 A1 | 5/1991 |
| WO | 2006/080743 A1 | 8/2006 |
| WO | 2009/098226 A1 | 8/2009 |

OTHER PUBLICATIONS

German Examination Report, dated Mar. 6, 2017, from related priority application DE102016122276.3, filed on Nov. 18, 2016. German.
International Search Report and the Written Opinion of the International Searching Authority, dated Jan. 25, 2018, from related PCT/EP2017/079418, filed on Nov. 16, 2017. German with English translation of the ISR.
https://courses.lumenlearning.com/wsu-sandbox2/chapter/properties-of-liquids/ pp. 1-16.

* cited by examiner

*Primary Examiner* — Michael L Leonard
(74) *Attorney, Agent, or Firm* — Preti Flaherty Beliveau & Pachios LLP

(57) ABSTRACT

The invention relates to a polyol displaying specific properties which allow it to be identified accessibly as a recycled polyol, particularly as a recycled polyol obtained from a new specific recycling process.

17 Claims, No Drawings

RECYCLED POLYOL

The present invention relates to a polyol displaying specific product properties which allow it to be identified accessibly as a recycled polyol, particularly as a recycled polyol obtained from a new specific recycling process.

Some millions of used mattresses are disposed of each year in Germany. These post-consumer mattresses contain, depending on the composition, useful amounts of polyurethane foam (PUR), high-resilience (HR) PUR foam, PUR viscofoam, synthetic or natural latex and steel springs. In addition there are fibers, textiles and wood elements and also undesirable constituents such as mold, bacteria, dust mites, skin flakes and viruses. In view of the tremendous quantity of used mattresses to be disposed of (in Germany alone 20 000 metric tons arise every year), and the legal obligations to take back used mattresses (e.g. in France and Belgium), there is the necessity of returning the mattresses back into the raw materials circuit in an ecological and economical process.

The situation with regard to other polyurethane waste from the post-consumer sector is similar: in automobile seats or furniture, e.g. sofas, and in further consumer articles such as cushions, upholstery, rests, PTC, too, appreciable quantities of polyurethane materials are processed and disposed of by the end consumer after use is finished. These materials, too, should as far as possible be returned to the raw materials circuit in a very ecological and economical process.

It is an object of the present invention to provide a generic polyol produced by a new process for producing isocyanate-reactive recycled polyols, which polyol is suitable for producing, in particular, rigid polyurethane foams.

It is known that polyurethanes (PUR) can be converted by chemical reaction into isocyanate-reactive, liquid products.

According to the prior art, not only the chemical conversion of polyurethanes (PUR) by means of water (hydrolysis) but also processes using amines (aminolysis), acids (acidolysis) or alcohols (alcoholysis) have been proposed in order to convert polyurethanes (PUR) into recycled polyols.

The alcoholysis of PUR is based on an equilibrium reaction in which superstoichiometric amounts of hydroxyl groups in the form of diols and/or triols are required for cleavage of the urethane groups.

The dissolution of polyurethane waste in glycols (glycolysis) at elevated temperature and precipitation of the amines by means of hydrogen chloride is described in U.S. Pat. No. 4,035,314 A.

Another variant, namely dissolution of polyurethane waste in diols, precipitation of the amines by means of halogenated esters of phosphoric acid, removal of the amine salts and reaction with isocyanates, is taught in U.S. Pat. No. 4,044,046 A.

The catalysis of the reaction with glycols is described in DE 2 238 109 A, DE 2 557 172, DE 2 711 145 A and DE 2 834 431. The typical transesterification catalysts, e.g. amino alcohols, metal carboxylates, hydroxides and alkoxides and Lewis acids, have been found to be effective catalysts in the glycolysis.

The polyols produced by the known alcoholysis process are suitable for the production of rigid PUR foams because of the relatively high hydroxyl equivalent, but the polyurethane waste has to be sorted according to chemical composition.

In the aminolysis of polyurethanes, a rapid reaction proceeds at a comparatively low temperature. Two phases are formed in the reaction mixture as a result of this reaction, namely a low-viscosity polyol phase and a hard oligourea phase. The polyol phase can be directly reacted again with a diisocyanate and/or polyisocyanate to give a product very similar to the original polyurethane. If, for example, a cold-cure molded flexible foam and a dipropylenetriamine are used in the cleavage, a cold-cure molded flexible polyurethane foam can be produced again by simple reaction of the polyol phase obtained with water and a polyaryl polyisocyanate.

The lower phase, consisting of oligourea (about 40%), is unfortunately unusable (without further reaction steps).

DE 195 12 778 C1 proposes the production of recycled flexible foam polyols by solvolysis of polyurethane waste in a degradation reaction with cyclic dicarboxylic anhydrides such as succinic anhydride, glutaric anhydride, malic anhydride, phthalic anhydride, dihalogenated phthalic anhydrides, tetrahalogenated phthalic anhydrides and the Diels-Alder adducts of maleic anhydride or the dicarboxylic acids on which these anhydrides are based or derivatives thereof in the presence of polyetherols having a molar mass of from 500 to 6000 g/mol and a hydroxyl functionality of from 2 to 5 at a temperature of from 140° C. to 250° C., with the polyetherols being subjected to a free-radical grafting reaction before, during or after the degradation reaction with carbon-unsaturated monomers containing carbonyl groups. According to the examples described, the process of DE 195 12 778 C1 leads to isocyanate-reactive polyol dispersions which, although they have a relatively low hydroxyl number, still have a comparatively high acid number of always above 5 mg KOH/g. However, an acid number of over about 2 mg KOH/g incurs the risk of an adverse effect on the blowing and gelling catalysts necessary for producing flexible polyurethane slabstock foam, through to blocking of these catalysts. The recycled polyols described in DE 195 12 778 C1 are therefore disadvantageous.

DE102013106364A1 describes a process for producing a polyurethane slabstock foam by acidolysis of polyurethane waste in a reaction with at least one dicarboxylic anhydride and a grafted polyol. In order to produce a high-quality recycled polyol suitable for producing original PUR slabstock foam, a specific duplex steel is used for this purpose.

All the processes described have the disadvantage that they require considerable presorting of the recycling materials in order to obtain a polyol or a polyol mixture usable for many purposes.

Accordingly, it is an object of the present invention to provide a recycled polyol which has a variety of uses and is readily accessible; in this context, "readily accessible" means, in particular, that it can be produced without the materials to be recycled having to be subjected to comprehensive presorting.

This object is achieved according to the invention by a polyol mixture (polyol-containing dispersion) having the following product properties:
hydroxyl number: from 35 to 650 mg KOH/g (for rigid foam preferably 160-500 mg KOH/g, flexible foam preferably 35-100 mg KOH/g, prepolymers, adhesives and elastomers 35-160 mg KOH/g. The amine number, acid number and viscosity should remain within the present ranges)
amine number: from 1 to 40 mg KOH/g
acid number: from 0.1 to 20 mg KOH/g
viscosity: from 800 to 50 000 mPa*s, characterized in that the polyol mixture comprises at least two compounds selected from the group consisting of calcium carbonate, styrene-acrylonitrile copolymers (SAN), polyisocyanate polyaddition polyols (PIPA), polyurea dispersion polyol (PHD) and melamine.

The amine number is determined in accordance with DIN 53176, the acid number in accordance with DIN 53402, the viscosity in accordance with DIN 53019 and the hydroxyl number in accordance with DIN 53240.

The polyol of the invention is obtainable by a process for producing isocyanate-reactive polyol dispersions from polyurethane waste from the post-consumer sector in the presence of polyetherols, characterized in that, in a first reaction step, a) the polyurethane waste is firstly reacted with a reaction mixture containing at least one dicarboxylic acid or dicarboxylic acid derivative, in particular a dicarboxylic anhydride, and at least one polyetherol having an average molar mass of from 400 to 6000 g/mol and a hydroxyl functionality of from 2 to 4, and preferably at least one free-radical former suitable for initiating a free-radical polymerization at temperatures of from 170° C. to 210° C. to form a dispersion;

and, in a second reaction step, b) the dispersion obtained under a) is reacted again with at least one short-chain diol and/or a short-chain triol (i.e. preferably in each case having from 2 to 8 carbon atoms, in the case of triols further preferably having 3 to 8 carbon atoms) at temperatures of from 180° C. to 230° C. to give an isocyanate-reactive polyol dispersion.

This process is described in the German patent application filed with the same priority and having the number DE 10 2016 122 275.5. This patent application is incorporated by reference into the present patent application, particularly insofar as it describes embodiments of the process for producing the polyol mixtures of the invention.

The polyol mixture of the invention is characterized in that it has been obtained from a recycling process without comprehensive presorting. Such recycling processes have not been known hitherto in the prior art or led to unsatisfactory products. The fact that the polyol has been obtained from recycling materials which have been subjected to little presorting can be discerned, inter alia, from particular fillers which are (still) present in the polyol mixture. Here, calcium carbonate, SAN, PIPA and PHD are particularly characteristic for the purposes of the invention.

It has surprisingly been found that recycled polyols which have good product properties can be obtained from polyurethane waste by means of the recycling process described above and that very much less or no presorting of the polyurethane waste is necessary for this purpose than in the case of the processes known from the prior art. Nevertheless, mechanical separation of the non-polyurethane constituents from the recycling material is often helpful.

The polyol mixtures of the invention thus represent a good raw material for new polyurethanes, and can preferably be mixed with base polyol, i.e. polyol which does not originate from a recycling process. Both rigid foams and flexible foams can thus be produced from the polyol mixtures of the invention, depending on how the individual product properties have been set, with the product properties being able to be set over wide ranges in the process by means of which the polyol of the invention is obtainable (see above).

Thus, 160-500 mg KOH/g should preferably be set as hydroxyl number for later use to give rigid foams, and preferably 35-100 mg KOH/g in the case of flexible foams.

To produce prepolymers, adhesives and/or elastomers, a hydroxyl number of 35-160 mg KOH/g should preferably be set.

The polyol mixture of the invention usually also contains minor constituents such as oligoureas and/or polyureas and polyamides in addition to polyols. Short-chain ureas and amides are also possible.

The polyol mixture of the invention is isocyanate-reactive, so that it can readily be used in the polyurethane production process.

The recycled (or recycling) polyols of the invention have a hydroxyl equivalent, or a hydroxyl functionality, which is in the range of that of polyetherols which are required for many applications.

The polyol of the invention is a comparatively high-quality polyol which is for the first time obtainable by a direct route, as described above, from comparatively unsorted polyurethane post-consumer waste.

All polyurethane waste based on flexible to semi-rigid polyurethanes from the post-consumer sector are, in particular, suitable as starting material here. These can optionally be polyurethanes mixed with other polymers and/or fillers, for example those based on polyether or polyester, and also polyureas and copolymers thereof. The process and use aspects of the polyurethanes used, for example whether they contain fillers and additives, or are solid or foamed, are of no consequence for the process of the invention. However, for process-related reasons, preference is given to using polyurethane waste which is free of textiles, steel, wood and other foreign materials and is in comminuted form. The degree of comminution can be chosen at will and merely influences the speed of the degradation reaction.

Flexible polyurethanes are, for the purposes of the present invention, polyurethanes which have an open cell structure and a hardness of from 300 to 500 N at 40% loading measured in accordance with SS-EN ISO 2439:2008(E) and also have an elasticity of from 25 to 60% (measured in accordance with EN ISO 8307).

Semi-rigid urethanes are materials which have an open cell structure but have a compressive strength of at least 100 kPa measured in accordance with EN ISO 844:2009.

For the purposes of the present invention, rigid polyurethane foam materials are materials which, in the region of the polyurethane, have a closed cell structure and a compressive strength of at least 100 kPa measured in accordance with EN ISO 844:2009.

Owing to the good qualities of the recycled polyol which can be obtained from the process of the invention, comparatively large proportions of the product obtained can be used in the production of high-quality polyurethane materials. The ratios specified are ratios by weight.

Preference is given to a polyol mixture according to the invention which is characterized in that it comprises ≥5% of ureas based on methylenedi(phenyl isocyanate) (MDI) and ≥50% of ureas based on tolulene diisocyanates (TDI), based on the total amount of all ureas present in the mixture.

Ureas based on MDI or TDI are those which have been formed from the corresponding raw materials.

These urea ratios also indicate the recycling process from which the polyol of the invention has been made available.

Preference is given to a polyol mixture according to the invention which is characterized in that the mixture comprises ≥5% of imides based on MDI and ≥50% of imides based on TDI, based on the total amount of all imides present in the mixture.

What has been said above applies analogously to imides based on MDI or TDI.

According to the invention, preference is likewise given to a polyol mixture comprising ≥5, preferably ≥6, more preferably ≥8, different pigments.

This preferred polyol mixture can be produced particularly advantageously: the many pigments is, in the present-day state of the art, an indication of the origin from the above-described recycling process. It can thus be produced particularly advantageously.

Pigments are, for the purposes of the present invention, in particular colorants in pigment form.

Preference is given to a polyol mixture according to the invention comprising at least two surface-tension-active materials selected from the group consisting of silicone-based surface-tension-active materials, in particular polysiloxane-polyoxyalkylene block copolymers.

As an alternative or in addition, preference is given to a polyol mixture according to the invention comprising at least two amines selected from the group consisting of triethylenediamine, N,N-dimethylethanolamine and other tertiary commercial amine catalysts for polyurethane production and/or at least two metal-organic catalysts, in particular dibutyltin dilaurate, tin octoate, and/or an amine and a metal, in each case selected from the abovementioned groups.

The amines are preferably catalysts and/or catalyst residues.

According to the invention, preference is also given to a polyol mixture comprising particles having a filter passage upper limit of 50μ, preferably 200μ, selected from the group consisting of sand particles, wood particles, cellulose fiber particles and textile fiber particles.

The filter passage upper limit is preferably 200μ. The preferred filter passage upper limit makes the product more readily accessible since the filtration rate can be increased by a higher filter exclusion volume.

Preference is given to a polyol mixture according to the invention comprising at least one compound selected from the group consisting of metal oxides, halogen-containing flame retardants, halogen-free flame retardants without melamine, reactive flame retardants and additive flame retardants or degradation products thereof.

Further preference, or alternative preference, is given to a polyol mixture according to the invention which is characterized in that ≥90% by weight of the polyols have a molar mass of from 106 to 300 000 g/mol and the average molar mass is 400-6000 g/mol.

Preference is likewise given to a polyol mixture according to the invention, wherein from 30% to 60% of the polyols in the polyol mixture have a molecular weight of from >200 to 700 g/mol.

The polyol mixture of the invention is a recycled product from unsorted starting material or starting material which has been subjected to little sorting. This leads to the polyols present in the polyol mixture having a molar mass distribution which normally differs from that of freshly prepared polyols.

The polyol mixture of the invention preferably comprises from 1% to 10% of polyols having a molar mass of from 75 to 106 g/mol and/or from 1% to 10% of polyols having a molar mass of from >106 to 200 g/mol and/or from 20% to 50% having a molar mass of from >700 to 3000 g/mol and/or at least 5% having a molar mass of from >3000 to 6000 g/mol and/or at least 1% having a molar mass of from >6000 to 30 000 g/mol. Here, the figures indicated are in each case based on the number of molecules (number average Mn) in the total number of the polyols present in the mixture.

EXAMPLE 1

35% by weight of a polyether triol (Dow Chemical Company, VORANOL CP 755) having an average molar mass of 700 g/mol were placed together with 15% by weight of phthalic acid, 5% by weight of maleic acid and an amount of 3% by weight of hydrogen peroxide (50% strength) in a stainless steel reactor and heated to 170° C. over a period of 120 minutes.

From this temperature, 40% by weight of waste composed of polyurethane post-consumer mattresses (unsorted, shredded to a size of about 2×2×2 cm) were added in such a way that the temperature was maintained in the range from 180° C. to 190° C. until the polyurethane materials had been dispersed.

The temperature was then increased to 210° C. and the mixture was stirred for two hours and, while stirring, 2% by weight of short-chain glycol (diethylene glycol) was then added in such a way that the temperature was maintained in the range from 205° C. to 220° C.

The mixture was stirred for a further one hour at a temperature of 210° C. (220) and then cooled while stirring to 80° C. The recycled polyol was then pumped off, filtered through a 250 μm self-cleaning filter and cooled to room temperature.

This gave a recycled polyol in which the acid number is reliably below 1.5 mg KOH/g and the content of primary aromatic amines was always below 0.05% by weight.

The product had the following property profile: (specification)

Hydroxyl number: 200 mg KOH/g, measured in accordance with DIN 53240
Acid number: 1.0 mg KOH/g, measured in accordance with DIN 53402
Viscosity: 2400 m Pas at 25° C., measured in accordance with DIN 53019
Amine number: 8 mg KOH/g, measured in accordance with DIN 53176
Detectable pigments >10

The recycled polyol (polyol mixture according to the invention) contained both calcium carbonate and also SAN, PIPA and PHD. In respect of the further features such as MDI/TDI ratio for ureas and amides, the number of pigments present, the surface-tension-active materials, the amines, the filterability of the particles present, the average molar mass and the molar mass distribution, it came within the above-described preferred ranges.

This recycled polyol is suitable for producing rigid polyurethane foam.

EXAMPLE 2

35% by weight of a long-chain polyether triol (Lupranol® 3300, BASF) having an average molar mass of 420 g/mol were placed together with 14% by weight of phthalic acid, 1% by weight of maleic acid, 1% by weight of acrylic acid and an amount of 3% by weight of tert-butyl hydroperoxide (PEROXAN BHP-70—PERGAN GmbH) in a stainless steel reactor and heated to 180° C. over a period of 120 minutes.

At this temperature, 40% by weight of waste composed of polyurethane post-consumer mattresses (unsorted, shredded to a size of about 2×2×2 cm) as were added in such a way that the temperature was maintained in the range from 180° C. to 190° C. until the polyurethane materials had been dispersed.

The mixture was then stirred for two hours and 6% by weight of short-chain glycol (diethylene glycol) was subsequently added in such a way that the temperature was kept in the range from 205° C. to 210° C.

The mixture was stirred for a further one hour at a temperature of 210° C., 2% by weight of dipropylene glycol was subsequently added and the mixture was maintained at 220° C. for a further 30 minutes and then cooled to 80° C. while stirring. The recycled polyol was then pumped off, filtered as in example 1 and cooled to room temperature.

The product had the following property profile:
Hydroxyl number: 265 mg KOH/g
Acid number: 0.5 mg KOH/g
Viscosity: 4500 m Pas at 25° C.,
Amine number: 16 mg KOH/g, in each case measured as in example 1.
Detectable pigments >10

The recycled polyol (polyol mixture according to the invention) contained both calcium carbonate and also SAN, PIPA and PHD. In respect of the further features such as MDI/TDI ratio for ureas and amides, the number of pigments present, the surface-tension-active materials, the amines, the filterability of the particles present, the average molar mass and the molar mass distribution, it came within the above-described preferred ranges.

The acid number was further decreased by the use of a short-chain glycol (dipropylene glycol). A negative influence on the catalysis in the subsequent production of rigid polyurethane foam is thereby avoided.

The process described makes it possible for the first time to match, in a direct way, the properties of recycled polyols to the polyols which were used for the production of the original polyurethanes or polyurethanes used here in reprocessing. Particularly in the case of flexible polyurethanes, this has not been possible using the processes known hitherto.

EXAMPLE 3

A number of foaming experiments for producing rigid polyurethane foam panels were carried out using recycled polyols (polyol mixture) according to the invention. In these foaming experiments, polyols were used in a weight ratio of rigid foam base polyol/recycled polyol (example 1 or 2) of from 90/10 to 60/40. Formulations customary for the production of rigid polyurethane foam panels were used and 7 industrial foaming tests at a foam density of from 28 kg/m$^3$ to 60 kg/m$^3$ were carried out.

It was possible to produce rigid PUR foam panels without the properties of the PUR products produced from base polyol/recycled polyol according to the invention being changed to a significant negative extent compared to corresponding original PUR products, i.e. compared to PUR products without addition of recycled polyol. The properties of the panels, e.g. compressive strength, dimensional stability and thermal conductivity, of the products was thus comparable or equally good.

The invention claimed is:
1. A polyol mixture having the following product properties:
   hydroxyl number: from 35 to 650 mg KOH/g
   amine number: from 1 to 40 mg KOH/g
   acid number: from 0.1 to 20 mg KOH/g
   viscosity: from 800 to 50 000 mPa*s at 25° C.,
wherein the polyol mixture comprises melamine and at least one compound selected from the group consisting of calcium carbonate, styrene-acrylonitrile copolymers (SAN), polyisocyanate polyaddition polyols (PIPA), and polyurea dispersion polyol (PHD); and
   wherein the polyol mixture comprises ≥5 different pigments.
2. The polyol mixture as claimed in claim 1, wherein the polyol mixture comprises ≥5% by weight of ureas based on methylenedi(phenyl isocyanate) (MDI) and ≥50% by weight of ureas based on tolulene diisocyanates (TDI), based on the total amount by weight of all ureas present in the mixture.
3. The polyol mixture as claimed in claim 1, wherein the mixture comprises ≥5% by weight of imides based on MDI and ≥50% by weight of imides based on TDI, based on the total amount be weight of all imides present in the mixture.
4. The polyol mixture as claimed in claim 1 comprising at least two surface-tension-active materials.
5. The polyol mixture as claimed in claim 1 comprising at least two amines, wherein each amine is selected from the group consisting of triethylenediamine, N,N-dimethylethanolamine and a not afore-mentioned tertiary commercial amine catalyst for polyurethane production.
6. The polyol mixture as claimed in claim 1 comprising particles having a filter passage upper limit of 50μ; and
   wherein the particles are selected from the group consisting of sand particles, wood particles, cellulose fiber particles and textile fiber particles.
7. The polyol mixture as claimed in claim 1 comprising at least one compound selected from the group consisting of metal oxides, halogen-containing flame retardants, halogen-free flame retardants without melamine, reactive flame retardants, and additive flame retardants or degradation products thereof.
8. The polyol mixture as claimed in claim 1,
   wherein ≥90% by weight of polypols in the polyol mixture have a molar mass of from 106 to 300 000 g/mol; and
   wherein ≥90% by weight of polypols in the polyol mixture have an average molar mass of 400-6000 g/mol.
9. The polyol mixture as claimed in claim 1, wherein a range in an amount of 30% to 60% of polyols in the polyol mixture has a molecular weight of in a range of from >200 g/mol to 700 g/mol.
10. The polyol mixture as claimed in claim 4, wherein the at least two surface-tension materials are silicone-based surface-tension-active materials.
11. The polyol mixture as claimed in claim 1 comprising at least two metal-organic catalysts.
12. The polyol mixture as claimed in claim 11, wherein each of the metal-organic catalysts is selected from a group consisting of dibutyltin dilaurate and tin octoate.
13. The polyol mixture as claimed in claim 1 comprising an amine and a metal.
14. The polyol mixture as claimed in claim 13, wherein the amine is selected from the group consisting of triethylenediamine, N,N-dimethylethanolamine and a not afore-mentioned tertiary commercial amine catalyst for polyurethane production.
15. The polyol mixture as claimed in claim 13, wherein the metal is a metal-organic catalyst.
16. The polyol mixture as claimed in claim 15, wherein the metal-organic catalyst is selected from the group consisting of dibutyltin dilaurate and tin octoate.
17. The polyol mixture as claimed in claim 10, wherein the silicone-based surface-tension active materials are polysiloxane-polyoxyalkylene block copolymers.

* * * * *